(12) United States Patent
Kreuter et al.

(10) Patent No.: US 8,701,616 B2
(45) Date of Patent: Apr. 22, 2014

(54) METHOD AND DEVICE FOR REDUCING ROTATIONAL NON-UNIFORMITIES OF THE CRANKSHAFT OF AN INTERNAL COMBUSTION PISTON ENGINE

(75) Inventors: Peter Kreuter, Aachen (DE); Mathias von Essen, Alsdorf (DD)

(73) Assignee: Meta Motoren- und Energie-Technik GmbH, Herzogenrath (DE)

( * ) Notice: Subject to any disclaimer, the term of this patent is extended or adjusted under 35 U.S.C. 154(b) by 859 days.

(21) Appl. No.: 12/602,470

(22) PCT Filed: May 27, 2008
(Under 37 CFR 1.47)

(86) PCT No.: PCT/EP2008/004205
§ 371 (c)(1),
(2), (4) Date: Oct. 5, 2010

(87) PCT Pub. No.: WO2008/145342
PCT Pub. Date: Dec. 4, 2008

(65) Prior Publication Data
US 2011/0083631 A1    Apr. 14, 2011

(30) Foreign Application Priority Data
May 31, 2007  (DE) .......................... 10 2007 025 549

(51) Int. Cl.
*F02B 75/06*  (2006.01)
(52) U.S. Cl.
USPC .......... 123/192.2; 123/192.1; 74/603; 74/604

(58) Field of Classification Search
USPC ................ 123/192.1, 192.2; 74/603, 604
See application file for complete search history.

(56) References Cited

U.S. PATENT DOCUMENTS 3,112,658 A * 12/1963 Berlyn ............................ 74/603
4,170,438 A   10/1979 Kondo et al.
4,481,918 A * 11/1984 Morton ....................... 123/192.2
4,979,476 A * 12/1990 Islas ............................ 123/197.4

(Continued)

FOREIGN PATENT DOCUMENTS

DE    3119388 A1    1/1983
DE    4115811 A1   11/1991

(Continued)

OTHER PUBLICATIONS

Office Action from German Patent Application No. 10 2007 025 549.9-12 dated Feb. 13, 2008

(Continued)

*Primary Examiner* — Marguerite McMahon
*Assistant Examiner* — James Kim
(74) *Attorney, Agent, or Firm* — J-Tek Law PLLC; Jeffrey D. Tekanic; Scott T. Wakeman

(57) ABSTRACT

In a method for reducing rotational non-uniformities of the crankshaft of a piston internal combustion engine, a movable balancing mass component is coupled to the crankshaft in such a way that the kinetic energy of the mass component increases in phases in which the angular speed of the crankshaft would increase if said crankshaft were not coupled to the balancing mass part, and decreases in phases in which the angular speed of the crankshaft would decrease if said crankshaft were not coupled to the balancing mass component.

22 Claims, 5 Drawing Sheets

(56) References Cited

U.S. PATENT DOCUMENTS

| | | | |
|---|---|---|---|
| 5,083,535 A * | 1/1992 | Deschler et al. | 123/192.2 |
| 5,758,615 A | 6/1998 | Kreuter | |
| 5,794,493 A * | 8/1998 | Bollig et al. | 74/603 |
| 6,892,997 B2 | 5/2005 | Kreuter | |
| 6,923,151 B2 | 8/2005 | Kreuter | |
| 7,055,470 B2 | 6/2006 | Kreuter et al. | |
| 7,464,800 B2 | 12/2008 | Nerubenko | |
| 2002/0117155 A1 | 8/2002 | Takeda et al. | |
| 2009/0007979 A1 | 1/2009 | Isono et al. | |

FOREIGN PATENT DOCUMENTS

| | | |
|---|---|---|
| DE | 19649712 A1 | 6/1998 |
| FR | 2565655 A1 | 12/1985 |
| GB | 2039601 | 8/1980 |
| JP | 03-219144 | 9/1991 |
| JP | 03-265737 | 11/1991 |
| JP | 06-341491 | 12/1994 |
| WO | 2006/106891 | 10/2006 |

OTHER PUBLICATIONS

Office Action from German Patent Application No. 10 2007 025 549.9-12 dated Jun. 25, 2008.

International Search Report for PCT/EP2008/004205.

International Preliminary Examination Report for parent application No. PCT/EP2008/004205.

* cited by examiner

| number of cylinders | 1 | 2 | 3 | 4 |
|---|---|---|---|---|
| 2-stroke | order 1 | order 2 | order 3 | order 4 |
| 4-stroke | order 0.5 | order 1 | order 1.5 | order 2 |

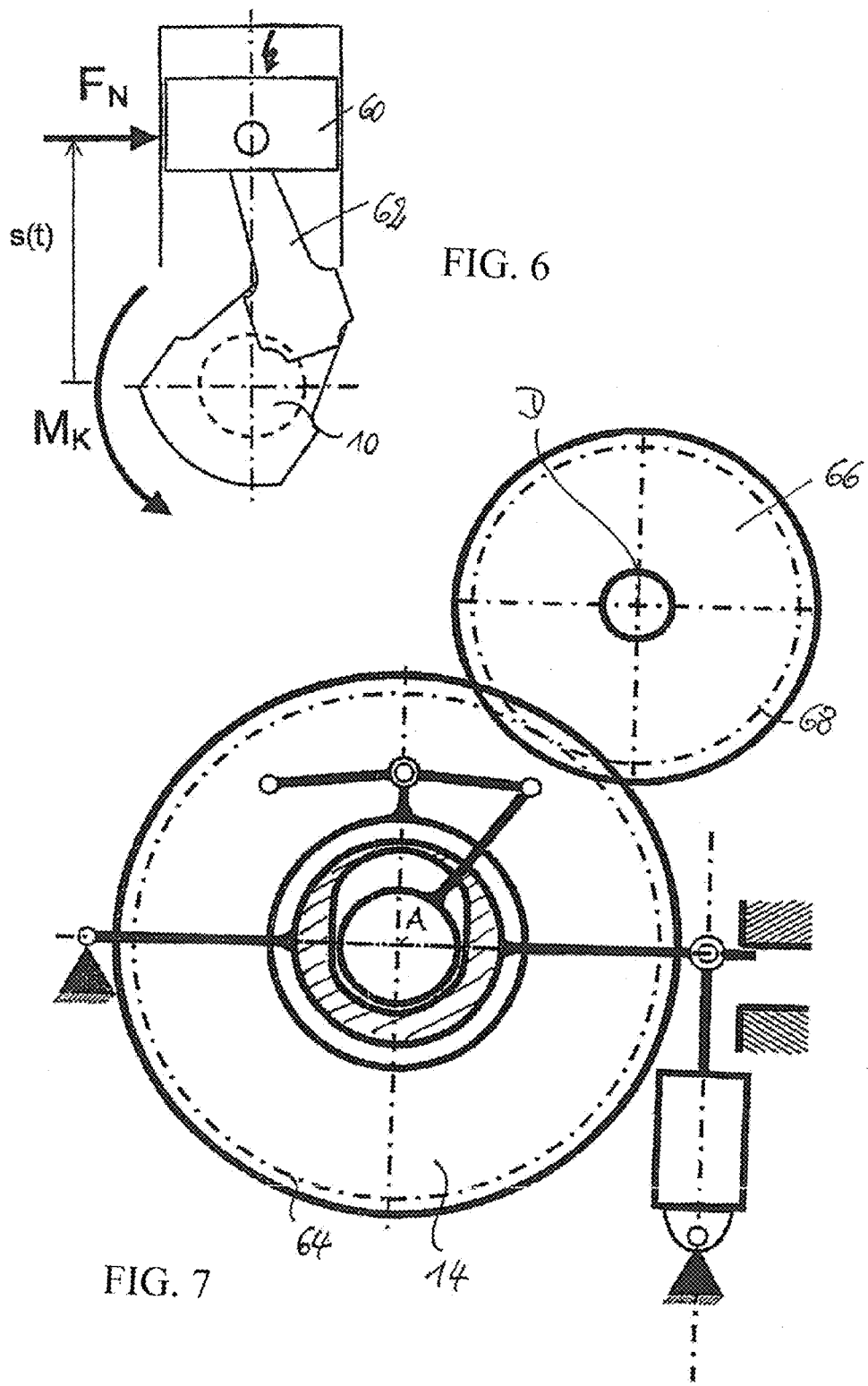

ately, the moment of inertia of the assembly decreases when the shaft accelerates, which boosts the acceleration of the shaft. When the rotational speed of the shaft decreases, the moment of inertia of the assembly increases, whereby the reduction of the rotational speed is boosted. All in all, this assembly achieves an improved response behavior of the internal combustion engine by reducing the effective moment of inertia.

METHOD AND DEVICE FOR REDUCING ROTATIONAL NON-UNIFORMITIES OF THE CRANKSHAFT OF AN INTERNAL COMBUSTION PISTON ENGINE

CROSS-REFERENCE

This application is the U.S. national stage of International application no. PCT/EP2008/004205 filed May 27, 2008, which claims priority to German patent application no. 10 2007 025 549.9 filed May 31, 2007.

TECHNICAL FIELD

The invention relates to a method and device for reducing rotational non-uniformities of the crankshaft of an internal combustion piston engine.

RELATED ART

A characteristic of the rotation of the crankshaft of internal combustion piston engines, in particular reciprocating-piston internal combustion engines, is that this rotation, which is generated by the working cycles of the piston(s) connected to the crankshaft, is non-uniform. This non-uniformity increases when the number of cylinders is reduced, when rotational speeds are low, and at high loads. In practice, it is attempted to counteract these rotational non-uniformities by using large flywheel masses, which are connected, if necessary, with the crankshaft in a manner having a low torsion constant. A further attempt to counteract the rotational non-uniformities is to connect a cam disk with the crankshaft in a torque-proof manner, which cam disk is followed by a follower member that is moveable against a spring force. During phases in which the angular speed of the crankshaft is to be reduced, the follower member is moved towards the spring, so that potential energy is stored therein. This potential energy can be stored back in the rotation of the crankshaft during phases in which the angular speed of the crankshaft is to be increased. Despite all previously-existing measures, engines with few cylinders, e.g., four or fewer cylinders, exhibit comfort disadvantages as compared to high-cylinder engines, which disadvantages adversely affect their acceptability. In view of the increasing importance of low fuel consumption, a so-called "downsizing" of the engines is desired, which downsizing necessarily leads to a reduced number of cylinders due to the minimum volume of the individual cylinders, which minimum volume is dictated by thermodynamic reasons.

A drivable shaft having a moment of inertia that is variable in an acceleration-dependent manner is known from DE 196 49 712 C2. An inertial mass, which moves counter to the rotational direction of the shaft from an idle position relative to the shaft to a displaced position when the rotation of the shaft is accelerated, moves flywheel mass elements via transmission means during its displacement movement towards a reduction of the radial distance from the rotational axis; the flywheel mass elements are connected to the shaft in a torque-proof manner and are movably guided approximately radially relative to the rotational axis. The inertial mass is formed as an inertial ring extending concentrically around the shaft, which inertial ring is connected with each flywheel mass element via the transmission means. If, starting at a state in which the flywheel mass elements are spaced a large distance from the shaft, the rotational speed of the shaft increases, the inertial ring lags behind the shaft, so that the distance between the flywheel mass elements and the shaft decreases. Conse-

SUMMARY

In one aspect of the present teachings, the rotational non-uniformities of the crankshaft can be considerably reduced, so that internal combustion piston engines having a low number of cylinders, e.g., four or fewer cylinders, exhibit a running comfort that is acceptable to demanding customers.

In another aspect of the present teachings, methods and devices capable of reducing rotational non-uniformities or torsional fluctuations of the crankshaft of an internal combustion piston engine are disclosed. For example, a movable compensating mass element may be coupled with a crankshaft such that the kinetic energy of the compensating mass element increases during phases in which the angular speed of the crankshaft would increase if it were not coupled with the compensating mass element, and decreases during phases in which the angular speed of the crankshaft would decrease if it were not coupled with the compensating mass element.

In another aspect of the present teachings, the compensating mass element is rotatable about an axis and is coupled with the crankshaft such that the angular speed of the compensating mass element increases relative to the angular speed of the crankshaft during phases in which the angular speed of the crankshaft would increase if it were not coupled with the compensating mass element. In addition, the angular speed of the compensating mass element preferably decreases relative to the angular speed of the crankshaft during phases in which the angular speed of the crankshaft would decrease if it were not coupled with the compensating mass element.

In another aspect of the present teachings, the amount of the increase and decrease of the angular speed of the compensating mass element is preferably changeable relative to the angular speed of the crankshaft.

In another aspect of the present teachings, a guide coupler is preferably rotatably supported relative to the crankshaft in a manner such that the rotational axis of the guide coupler is movable or displaceable relative to the rotational axis of the crankshaft. The guide coupler may be coupled, via at least one connecting member, with a driver extension that is connected to the crankshaft in a torque-proof manner, i.e. such that the driver extension and the crankshaft rotate together in a fixed relationship. The guide coupler is also preferably connected with the compensating mass element via at least one additional connecting member. The axes of all hinge connections between the connecting members, the guide coupler and the driver extension are preferably parallel to the rotational axis of the crankshaft. In a further optional embodiment, an imaginary line connecting the rotational axis of the guide coupler and the rotational axis of the crankshaft, as viewed along the rotational axes, is approximately aligned or substantially coincides with the line of movement of a piston connected to the crankshaft of the internal combustion piston engine.

In another aspect of the present teachings, energy and/or power may be drawn off from the crankshaft and stored in the compensating mass element during phases in which the crankshaft supplies a high torque. During phases in which the crankshaft supplies little torque or must be driven itself, because the piston(s) connected to the crankshaft is(are) performing compression work or discharge work, the energy stored in the compensating mass element is returned to the crankshaft. By directly storing kinetic energy in the compensating mass element, no complex energy conversions are necessary and such an embodiment can operate with high efficiency.

The invention will be explained below, exemplarily and in further detail, with the assistance of schematic figures.

BRIEF DESCRIPTION OF THE DRAWINGS

FIG. 6 depicts a schematic view of a piston-cylinder unit, FIG. 7 depicts a schematic end view of a modified embodiment of FIGS. 1 and 2.

DETAILED DESCRIPTION OF THE INVENTION

Figure 1:
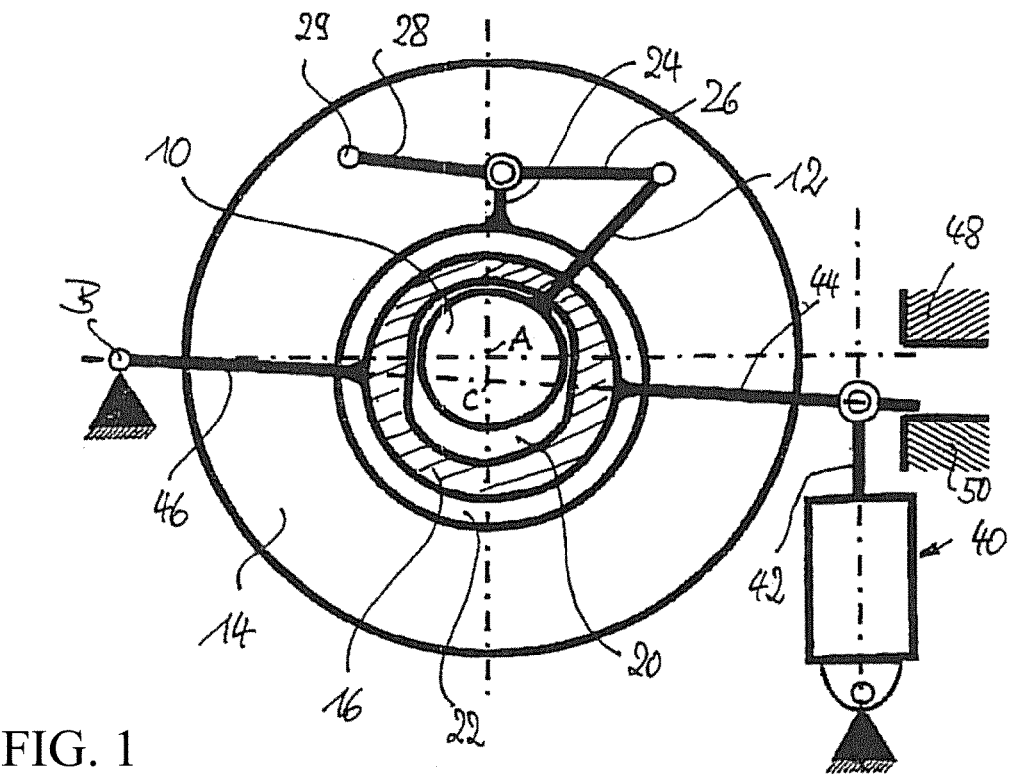
FIGS. 1 and 2 depict end views of an embodiment of the present teachings in different operating states, FIGS. 3a) to 3c) depict representative torque curves of a 4-cylinder, four-stroke, spark-ignition engine operated according to one aspect of the present teachings.

According to FIG. 1, which shows an end view of an inventive device, a crankshaft 10 of an internal combustion piston engine having a known structure comprises a radially-protruding driver extension 12 that is connected in a torque-proof manner with, or is formed integrally with, the crankshaft 10. A compensating mass element 14 is supported on the crankshaft 10 adjacent to the driver extension 12, which compensating mass element is advantageously balanced with regard to the rotational axis A of the crankshaft 10.

Axially adjacent to the compensating mass element 14, a bearing shield 16 (shaded; the axial arrangement is not visible in FIG. 1) is supported on a not-illustrated engine housing so as to be pivotable about an axis B that is spaced from the rotational axis A of the crankshaft. The bearing shield 16 has a through-hole 20, through which the crankshaft 10 extends, so that the above-described component assembly can be disposed at a terminal end of the crankshaft or in a central region of the crankshaft. The pivot axis B is parallel to the rotational axis A of the crankshaft. A guide coupler 22 with a radially protruding arm 24 is rotatably supported on the bearing shield 16 that is pivotable relative to the crankshaft.

The radial arm 24 is connected to the driver extension 12 via a connecting member 26 and is connected via a further connecting member 28 with the compensating mass element 14 in a hinge 29. Elements, such as driver extension 12 and connecting members 26 and 28, that connect the crankshaft 10 to the compensating mass element 14 may be referred to generally as a "coupling device." Advantageously, the connecting members 26 and 28 are coaxially hinged to the arm 24 of the guide coupler 22. The connecting member 28, for example, projects into a radial slot (not illustrated) of the compensating mass element 14 and is supported therein by a pin. The pivot axes of the hinges, about which the connecting members are pivotable relative to each other and are pivotable relative to the driver extension 12, the guide coupler 22 and the compensating mass element 14, are parallel to each other and are parallel to the axes A and B.

By pivoting the bearing shield 16 about the axis B of the bearing mounted on the engine housing, the spacing between the rotational axis C, about which the guide coupler 22 rotates, and the rotational axis A of the crankshaft can be changed. An adjusting device, identified as a whole by 40, is provided for pivoting the bearing shield 16, which adjusting device 40 includes an adjusting member 42 connected to an arm 44 in a hinged manner, which arm 44 is rigidly connected to the bearing shield 16. Approximately in the direction of extension of the arm 44, the bearing shield 16 has another arm 46 on its opposite side, which is rigidly connected therewith and is pivotable about the pivot axis B. The adjusting member 42 can be moved in the vertical direction according to FIG. 1 in a known manner using a hydraulic cylinder or an electric motor, wherein the moveability is advantageously limited by stops 48 and 50.

The above-described device can be constructed in a highly compact manner with an interleaved construction. The compensating mass element 14 is rotatably supported on the crankshaft between the guide coupler 22 and the driver extension 12 and coaxially with the rotational axis A of the crankshaft. The guide coupler 22 is supported so as to be rotatable about the rotational axis C that is defined by the bearing shield 16. Axially adjacent to the guide coupler 22, the arms 44 and 46 of the bearing shield 16 extend. It is understood that the eccentric pivotability of the bearing shield 16 relative to the crankshaft and its adjustment can also be provided by other constructions, e.g., by supporting the bearing shield directly with a pin in the engine housing, which pin is disposed eccentric to the rotational axis of the crankshaft.

FIG. 1 illustrates the state of the assembly wherein the rotational axis C of the guide coupler 22 is maximally spaced from the rotational axis A of the crankshaft 10. Advantageously, the connecting line between the rotational axes A and C is parallel to the moving direction of the not-illustrated pistons of the internal combustion engine, which are connected to the crankshaft 10, and is aligned in the illustrated view with the line of movement of the pistons. Minor directional changes of the connecting line during pivoting of the bearing shield 16 about the pivot axis B need not be considered. The arrangement of the driver extension 12, the radial arm 24 and the connecting members 26 and 28 is such that the connecting members 26 and 28 pass through their extended position twice during one revolution of the crankshaft 10 or during the revolution of the guide coupler 22 that is eccentric therewith, so that the compensating mass 14 of the crankshaft 10 advances and lags, respectively, twice during one revolution, i.e. rotates at a higher and a lower speed, respectively, than the crankshaft. The advancement and lag, respectively, can be adapted to the particular requirements by the geometrical arrangement of the connecting members.

Figure 2:
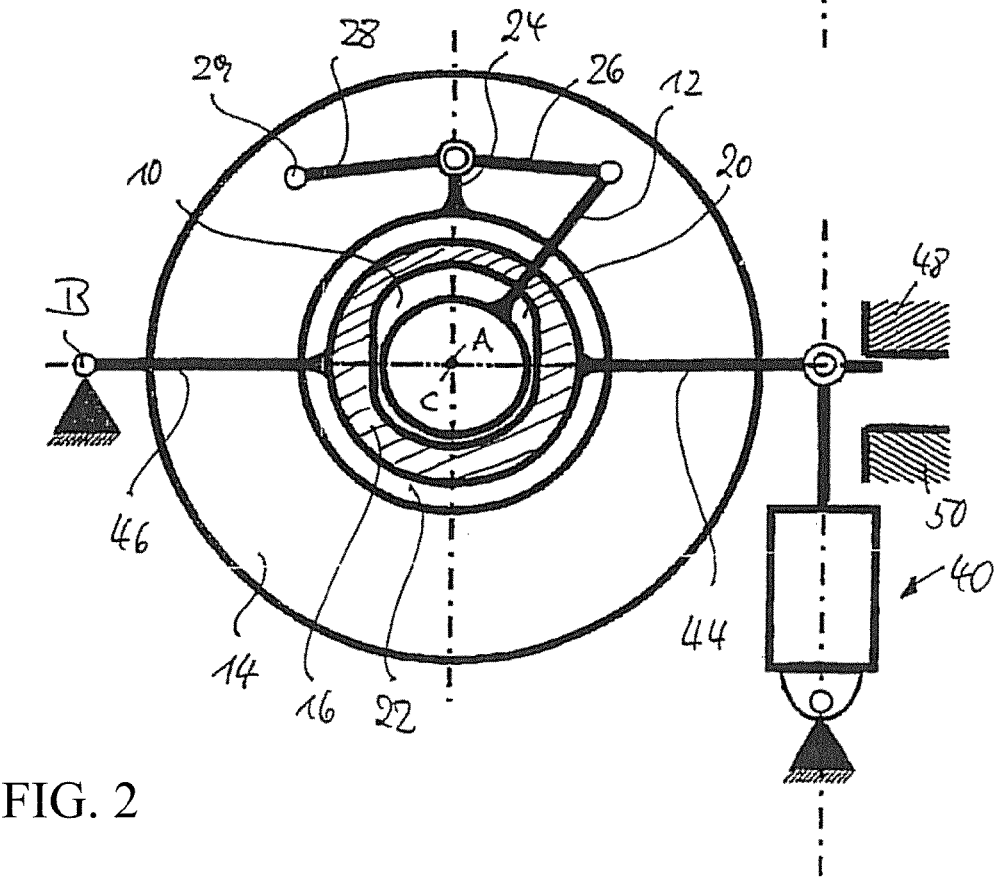

FIG. 2 shows the state of the assembly of FIG. 1 wherein the rotational axes A and C coincide; that is, the state of maximal eccentricity according to FIG. 1 has been shifted to the state of minimal eccentricity in which the guide coupler 22 rotates coaxially with the crankshaft 10. In this state of minimal eccentricity, the positioning of the driver extension and the connecting members 26 and 28 and the radial arm 24 relative to each other remains constant, so that the compensating mass element 14 always rotates at the same angular speed as the crankshaft 10.

In contrast thereto, in the position according to FIG. 1, the compensating mass element 14 must be cyclically accelerated and decelerated, so that the crankshaft must apply additional torque to the compensating mass element during phases of rotation in which the compensating mass element is accelerated, and the crankshaft receives an additional torque from the compensating mass element during other phases of rotation, in which the angular speed of the compensating mass element is reduced relative to the crankshaft.

FIG. 3a) shows an exemplary torque curve of a charged, 4-cylinder, spark-ignition engine that is operated in the four stroke process and rotates at a speed of, for example, 1000 rpm at full load. The abscissa indicates the rotational position of the crankshaft in degrees, and the ordinate indicates the torque from the crankshaft, which torque is acting in the drive train of the vehicle. The torque fluctuations are larger at increasing loads and become increasingly noticeable in an unpleasant manner in the drive train when the rotational speed decreases, whether it is due to acceleration fluctuations of the entire vehicle or due to noises or vibrations, all of which are perceptible by the vehicle occupants in a comfort-reducing manner.

Figure 3:
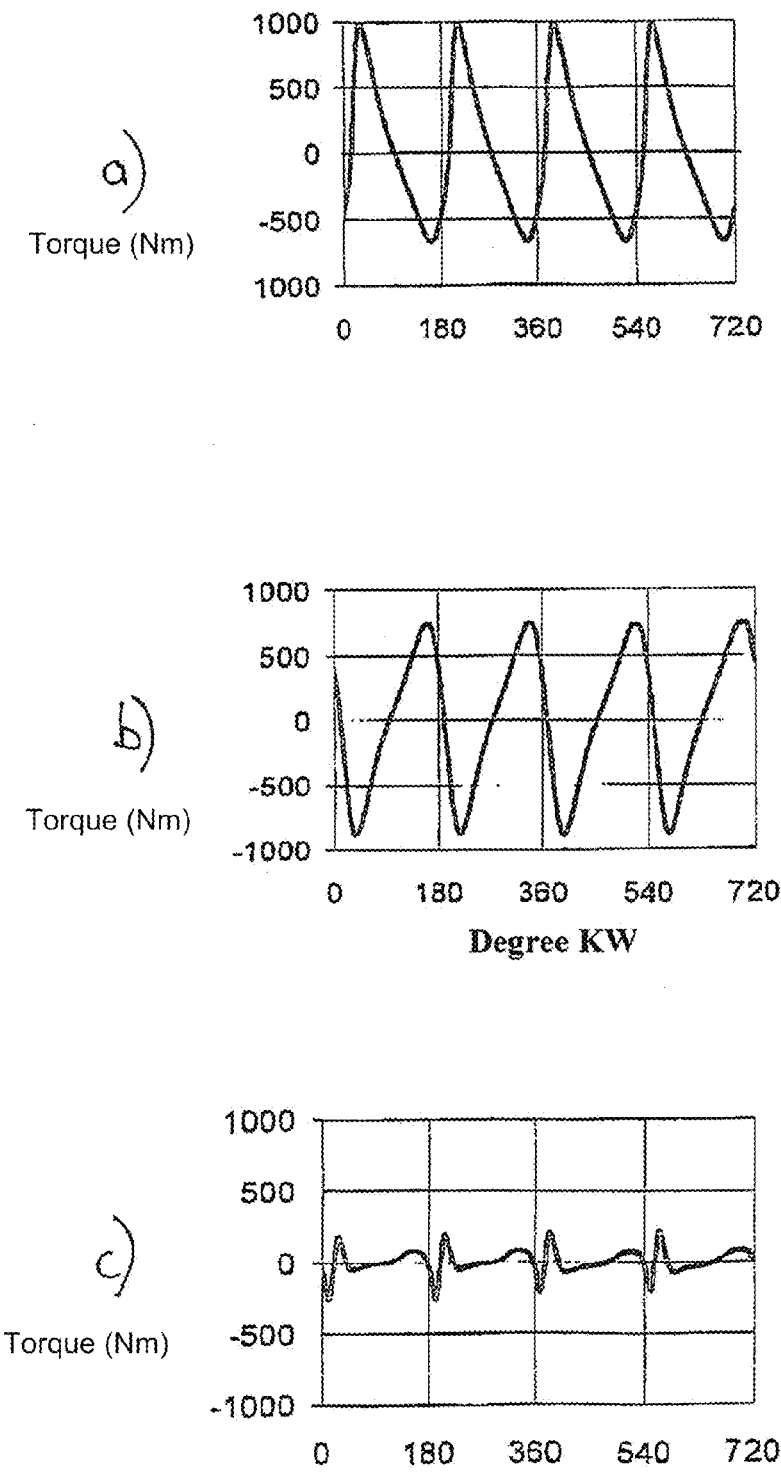

Part b) of FIG. 3 shows the torque that is producible by the above-described first embodiment and that can be applied by the compensating mass 14 to the crankshaft 10. As can be seen, a negative torque is necessary for accelerating the compensating mass element during phases in which the crankshaft generates a high positive torque and, conversely, the compensating mass element supplies a positive torque to the crankshaft in the phases during crankshaft deceleration in which the crankshaft experiences a negative torque due to the work being performed by the pistons. In summary, by equipping a known internal combustion engine with a device according to the first embodiment, an overall torque, which is illustrated in FIG. 3c), results at the crankshaft, wherein the torque fluctuations of the crankshaft are considerably reduced as compared to the torque fluctuations of FIG. 3a). Hence, a very comfortable, even speed of the internal combustion piston engine is achieved, even when it has a relatively low number of cylinders. It is pointed out that FIG. 3 shows the torque fluctuations. In particular in the illustrations of FIGS. 3a) and 3c), the curves must be shifted upwards by the average torque that is supplied by the crankshaft to the vehicle. By pivoting the bearing shield 16, the device can be adjusted to the respective compensation requirements. At high fluctuations, it is therefore operated with high eccentricity and/or with a large distance between the rotational axes A and C. At low fluctuations, the eccentricity is decreased.

Figures 4, 5:
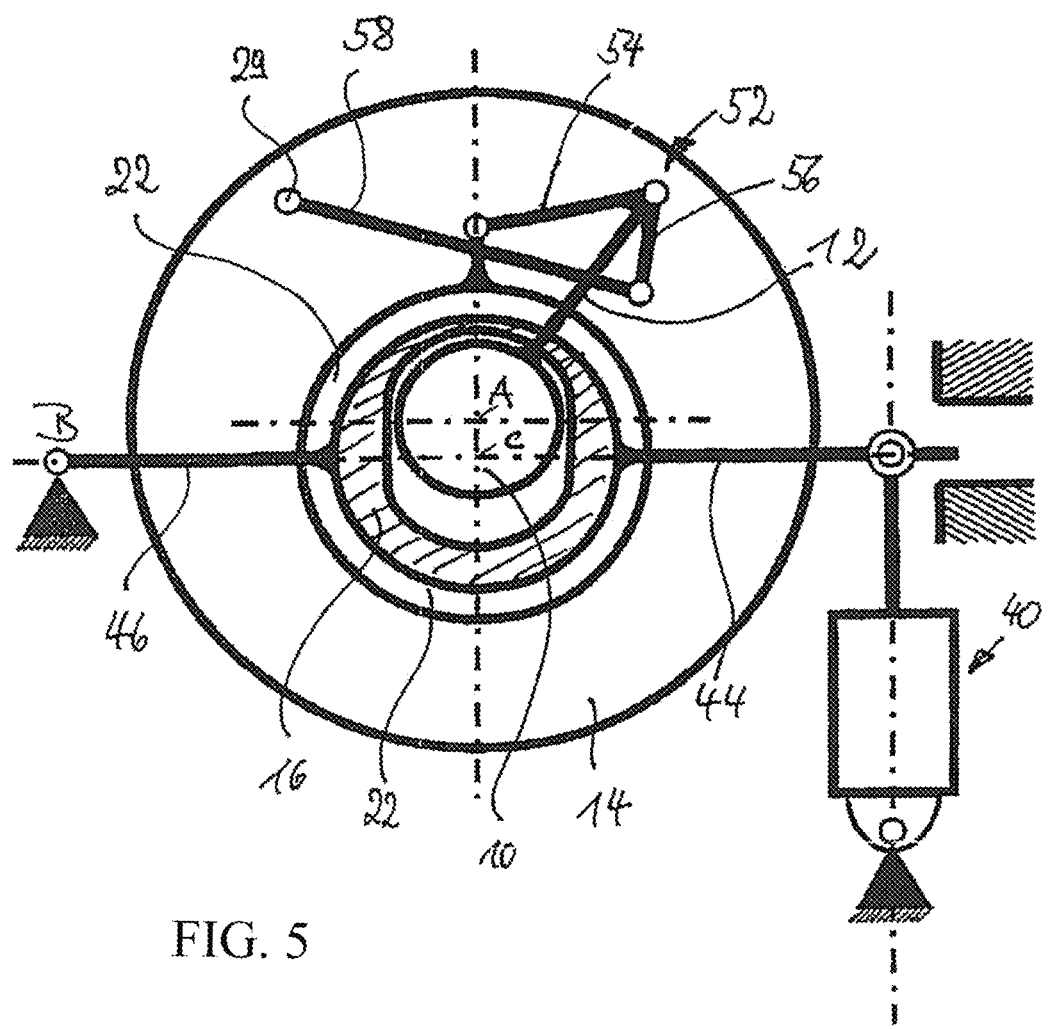
FIG. 4 depicts a table that shows the main orders of the alternating torques that are preferably compensated for different types of engines.
FIG. 5 depicts a schematic end view of an embodiment modified with regard to FIG. 1.

FIG. 4 shows in tabular form the main orders of the alternating torques shown in FIG. 3a), which must be compensated, for internal combustion engines having different numbers of cylinders and different operating principles (two-stroke process, four-stroke process).

The arrangement shown in FIGS. 1 and 2 is suitable for reducing torque fluctuations at the crankshaft for the second order of a 2-cylinder two-stroke engine or a 4-cylinder four-stroke engine.

In the second embodiment according to FIG. 5, the eccentric movement and/or the stroke movement of the guide coupler 22 relative to the crankshaft 10 is converted into a relative rotation between the compensating mass element 14 and the crankshaft 10 by pivoting the connecting member 52. This pivoting takes place once during each revolution of the crankshaft, so that the embodiment according to FIG. 5 is suitable for reducing torque variations at the crankshaft for the first order in a 1-cylinder two-stroke engine or a 2-cylinder four-stroke engine.

Devices according to the present teachings can also be used for compensating torque fluctuations and/or rotational non-uniformities at the crankshaft of other engines, e.g., 3-cylinder engines, in which, for example, the driver extension 12 is not rigidly connected with the crankshaft, but rather is connected with the crankshaft via a speed-increase gear unit or speed-decrease gear unit, as a result of which the driver extension rotates at a speed suitable for compensating torque fluctuations, e.g., in a 3-cylinder engine having a rotational speed increased by the factor 1.5 in comparison to the embodiment of the respective device for a 2-cylinder engine.

FIG. 6 schematically shows a piston 60 of a cylinder of a reciprocating-piston internal combustion engine, which is connected with the crankshaft 10 via a piston rod 62 in a known manner. During four-stroke operation, only one working stroke takes place in a known manner during two revolutions of the crankshaft; a driving torque MK is applied to the crankshaft 10 by the piston 60 in the working stroke. The inclination of the piston rod 62 relative to the vertical line results in that the piston 60 is braced on the cylinder wall by lateral forces. These lateral forces can be compensated by applying a counter moment FN×s(t) to the engine block.

FIG. 7 shows an example of how such a counter moment is applied to the engine block. For this purpose, the assembly according to FIG. 1 is augmented in the illustrated example such that the compensating mass element 14 is provided with a circumferential toothing 64, and a further compensating mass element 66 is supported on the engine housing so as to be rotatable about an axis D, which is spaced from the rotational axis A of the crankshaft; the compensating mass element 66 is formed with a circumferential toothing 68 whose diameter is half the diameter of the circumferential toothing 64. Thus, the other compensating mass element 66 rotates at a speed that is twice the speed of the compensating mass element 14, wherein it fully experiences the rotational non-uniformities of the compensating mass element 14. In this way, the additional compensating mass element 66 can be used for generating a counter moment that compensates the lateral piston forces, according to FIG. 6, in the illustrated example for a 4-cylinder four-stroke engine.

At this point, it is again pointed out that the compensating mass element 14 and the additional compensating mass element 66 are advantageously balanced with regard to their respective rotational axes. They can be formed as disk-shaped or in other ways. The additional compensating mass element 66 may be used for a known two-shaft compensation of the second order for the free inertial forces. In contrast to the conventional dampening of rotational non-uniformities using a flywheel, according to one aspect of the present teachings the angular speed of the compensating mass element is systematically changed substantially in phase with the angular speed of the crankshaft. Consequently, the moment of inertia of the compensating mass element can be smaller than the moment of inertia of conventional flywheels, so that the engine responds well to position changes of the accelerator pedal.

Figure 8:
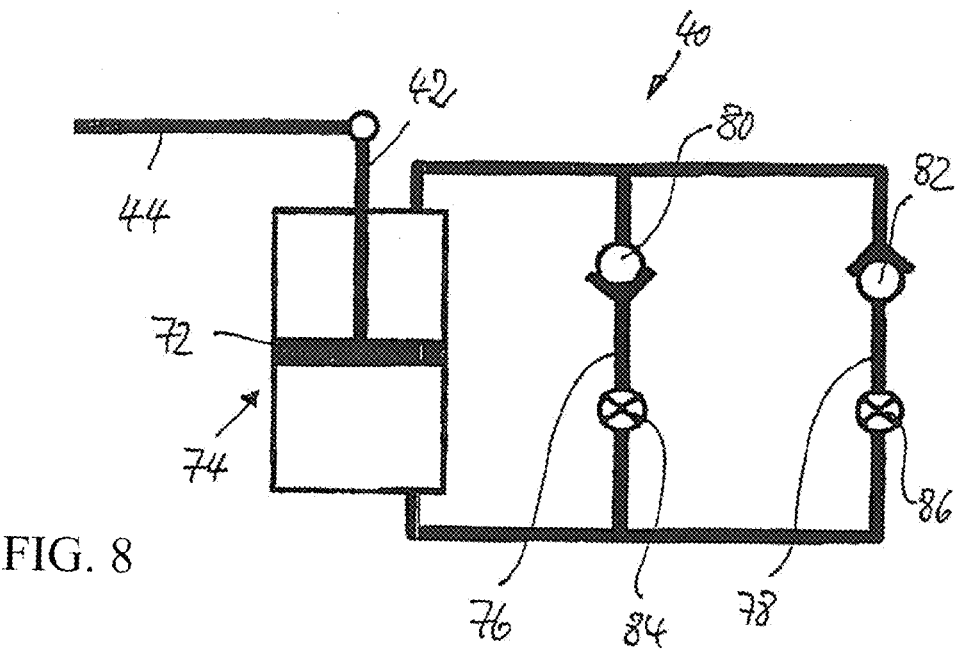
FIG. 8 depicts a schematic diagram of an embodiment of an adjusting device and FIG. 9 depicts a sketch for explaining a mass compensator.

FIG. 8 schematically shows a particularly simple embodiment of an adjusting device 40. The arm 44 of the bearing shield 16 (FIG. 1) is connected in a hinged manner to a shaft of a piston 72 of a double-acting piston cylinder unit, which shaft serves as an adjusting member 42; the pressure chambers of said piston cylinder unit are connected with each other via two conduits 76 and 78. A one-way valve 80 and 82 is arranged in each of the conduits 76 and 78, wherein the one-way valves 80 and 82 act oppositely to each other. Further, a shutoff valve 84 and 86 is disposed in each respective conduit.

Due to the eccentric bearing of the bearing shield 16, alternating forces act on the arm 44 during each revolution of the compensating mass element 14, which forces are directed upwards or downwards according to the figures. Depending on the opening of one of the shutoff valves 84 or 86, a hydraulic fluid located in the piston cylinder unit 74 can only flow from one pressure chamber into the other one, so that a displacement in the one or the other direction takes place by correspondingly controlling the shutoff valves 84 and 86, without the need for an external source of pressurizing medium. It is understood that a suitable re-filling mechanism for hydraulic fluid ensures that the conduits and the piston cylinder unit are constantly filled with hydraulic fluid and are free from air.

Figure 9:
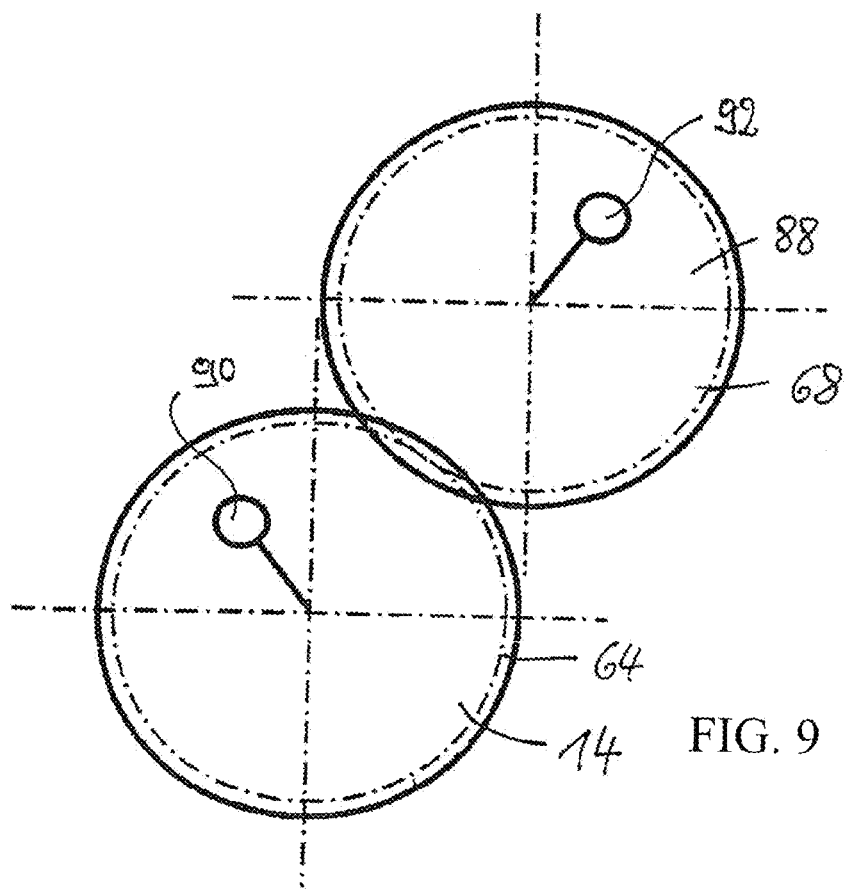

With the help of FIG. 9, a fourth embodiment is explained that shows how, according to another aspect of the present teachings, not only rotational non-uniformities of the crankshaft can be compensated, but also how a mass compensation can be carried out in a 1-cylinder two-stroke engine or in a 2-cylinder four-stroke engine. The compensating mass element of FIG. 9, which is denoted with 14, corresponds to the compensating mass element 14 of the second embodiment according to FIG. 5, whose remaining components are not illustrated in FIG. 9 for the sake of simplicity. The compensating mass element 14 has a circumferential toothing 64 that meshes with a circumferential toothing 68 of another compensating mass element 88. Reference numerals 90 and 92 denote unbalanced masses of the compensating mass elements; that is, in contrast to the above-described embodiment, the compensating mass element 14 is not balanced relative to its rotational axis, but rather has a specific unbalanced mass 90. The unbalanced masses 90 and 92 are preferably equal and arranged such that they are each located simultaneously in the vertical position according to FIG. 5, i.e. they simultaneously pass the top dead center and the bottom dead center, and are disposed in opposite phase in their horizontal positions. As was already explained with the help of FIG. 5, this arrangement is also preferably used for compensating rotational non-uniformities of the crankshaft of a 1-cylinder two-stroke engine or 2-cylinder four-stroke engine. When the unbalanced masses are arranged relative to the piston of a 1-cylinder two-stroke engine or the pistons of a 2-cylinder four-stroke engine such that they are located in the bottom dead center when the piston(s) is/are located in the top dead center, a mass compensation can be achieved for said engines with the arrangement according to FIG. 5.

The present teachings, which have been described above in an exemplarily manner, can be modified in various ways. In the embodiments according to FIGS. 1, 2, 5 and 7, the adjusting device 40 may, for example, comprise a hydraulic cylinder whose hydraulic fluid is pressurized fuel, e.g., diesel fuel diverted from a common rail system, so that no separate hydraulic pressure source is required. The hydraulic cylinder is controlled in a known manner using valves that are actuated by an electronic control device, dependent on the torque fluctuation compensation required at the respective load point of the internal combustion engine. The described pivoting of the bearing shield 16 can be replaced by a linear movability of the bearing shield in a coulisse that is affixed to the engine housing. The present teachings are suitable for use in reciprocating-piston internal combustion engines as well as in rotary-piston internal combustion engines.

Instead of, or in addition to, the adjustability of the bearing shield 16, the compensating mass element 14 can be formed such that its moment of inertia 14 is changeable, e.g., by providing the compensating mass element with two mass bodies whose spacing is changeable. By changing the moment of inertia, the device can be adapted to the respective to-be-compensated rotational non-uniformities.

A device having the compensating mass element and the coupling with the crankshaft may be disposed variously, for example, at an end of the crankshaft or—in engines with plural cylinders—between the pistons. Several devices according to the present teachings can be provided on one crankshaft.

REFERENCE NUMBER LIST

10 crankshaft
12 driver extension
14 compensating mass element
16 bearing shield
20 through-hole
22 guide coupler
24 radial arm
26 connecting member
28 connecting member
29 hinge
40 adjusting device
42 actuator
44 arm
46 arm
48 stop
50 stop
52 connecting member
54 arm
56 arm
58 connecting member
60 piston
62 piston rod
64 circumferential toothing
66 compensating mass element
68 circumferential toothing
72 piston
74 piston-cylinder unit
74 conduit
76 conduit
80 one-way valve
82 one-way valve
84 shutoff valve
86 shutoff valve
88 compensating mass element
90 unbalanced mass
92 unbalanced mass

The invention claimed is:

1. A method for reducing non-uniformities in a rotational speed of a crankshaft of an internal combustion piston engine, wherein a movable compensating mass element is coupled with the crankshaft and is pivotable about an axis that is stationary relative to a engine housing of the internal combustion piston engine, the method comprising:
   increasing the kinetic energy of the compensating mass element during phases in which the angular speed of the crankshaft would increase if it were not coupled with the compensating mass element, wherein the angular speed of the compensating mass element increases relative to the angular speed of the crankshaft, and
   decreasing the kinetic energy of the compensating mass element during phases in which the angular speed of the crankshaft would decrease if it were not coupled with the compensating mass element, wherein the angular speed of the compensating mass element decreases relative to the angular speed of the crankshaft.

2. The method according to claim 1, wherein the amount of the increase and decrease of the angular speed of the compensating mass element is changeable relative to the angular speed of the crankshaft.

3. A device comprising:
a crankshaft,
a first compensating mass element coupled to the crankshaft and pivotable about an axis that is stationary relative to a engine housing of an internal combustion piston engine and
a coupling device configured to rotatably drive the first compensating mass element during at least one complete revolution of the crankshaft at an angular speed that is at least once increasing and at least once decreasing relative to the angular speed of the crankshaft, such that, in predetermined phases of the rotation of the crankshaft, additional energy is transferable from the crankshaft to the first compensating mass element and is then transferable from the first compensating mass element back to the crankshaft.

4. The device according to claim 3, wherein the first compensating mass element is supported at least substantially coaxially to the crankshaft.

5. The device according to claim 4, wherein the coupling device comprises:
a guide coupler rotatably supported relative to the crankshaft such that a rotational axis of the guide coupler is movable between an at least substantially co-axial position and a spaced position relative to a rotational axis of the crankshaft,
a driver extension coupled to the crankshaft so as to rotate together in a fixed relationship,
at least one first connecting element coupling the driver extension with the guide coupler, and
at least one second connecting element coupling the first compensating mass element with the driver extension,
wherein the rotational axes of all pivotable connections between the connecting elements, the guide coupler and the driver extension are parallel to the rotational axis of the crankshaft.

6. The device according to claim 5, wherein the driver extension is rigidly connected with the crankshaft.

7. The device according to claim 5, wherein the first compensating mass element is supported on the crankshaft between the driver extension and the guide coupler.

8. The device according to claim 5, wherein the at least one first connecting element and the at least one second connecting element are supported coaxially to the guide coupler.

9. The device according to claim 5, wherein an imaginary line connecting the rotational axis of the guide coupler with the rotational axis of the crankshaft when the guide coupler is disposed eccentrically to the crankshaft, as viewed along the direction of the rotational axes, is at least substantially aligned with a line of movement of a piston of the internal combustion piston engine that is connected to the crankshaft.

10. The device according to claim 5, further comprising a bearing shield supporting the guide coupler, wherein the spacing between the bearing shield and the rotational axis of the crankshaft is changeable.

11. The device according to claim 10, further comprising an actuator configured to move the rotational axis of the guide coupler between the at least substantially co-axial position and the spaced position relative to the rotational axis of the crankshaft, the actuator comprising at least one of:
a hydraulic cylinder in fluid communication with a pressurized fuel source of the internal combustion piston engine,
a double-acting hydraulic cylinder having two pressure chambers in fluid communication with each other such that a flow of hydraulic fluid between the pressure chambers is selectively controllable in the one or the other direction, and
an electric motor.

12. The device according to claim 5, wherein the coupling device is configured such that, when the guide coupler is eccentrically disposed relative to the crankshaft, the first and second connecting members pass through an extended position twice during each revolution of the crankshaft.

13. The device according to claim 5, wherein the driver extension and the guide coupler are connected via a first arm of a two-armed connecting member, a second arm of the two-armed connecting member is connected with the compensating mass element via a further connecting member, wherein a radial relative movement between the guide coupler and the crankshaft is convertible into a relative rotation between the crankshaft and the compensating mass element, which is advanced and is lagging once per revolution of the crankshaft.

14. The device according to claim 5, further comprising a second compensating mass element rotatably drivable by the first compensating mass element at a predetermined transmission ratio.

15. The device according to claim 14, wherein the first and second compensating mass elements are rotatably connected to each other via gear teeth.

16. The device according to claim 14, wherein the second compensating mass element is configured to rotate at a rotational speed that is twice the rotational speed of the first compensating mass element.

17. The device according to claim 14, wherein the first and second compensating mass elements rotate at the same speed in opposite directions and include unbalanced masses, which are disposed so as to be located at a bottom dead center when a piston of a 1-cylinder two-stroke engine or pistons of a 2-cylinder four-stroke engine is/are located at a top dead center.

18. A method for reducing a magnitude of torque fluctuations experienced by a crankshaft of an internal combustion piston engine having a compensating mass element that is coupled with the crankshaft so as to be rotatable relative to the crankshaft and is pivotable about an axis that is stationary relative to a engine housing of the internal combustion piston engine, the method comprising:
increasing an angular speed of the compensating mass element relative to an angular speed of the crankshaft during at least a portion of crankshaft rotation in which the crankshaft experiences a relatively high positive torque, and
decreasing the angular speed of the compensating mass element relative to the angular speed of the crankshaft during at least a portion of the crankshaft rotation in which the crankshaft experiences a relatively low or negative torque.

19. The method according to claim 18, wherein the angular speed of the compensating mass element is increased at least in part by transferring kinetic energy from the crankshaft to the compensating mass and the angular speed of the compensating mass element is decreased at least in part by transferring kinetic energy from the compensating mass element to the crankshaft.

20. The method according to claim 1, wherein the compensating mass is angularly rotatable with respect to the crankshaft.

21. The device according to claim 3, wherein the compensating mass is angularly rotatable with respect to the crankshaft.

22. The method according to claim 18, wherein increasing the angular speed of the compensating mass element comprises moving the compensating mass element at an angular speed faster than an angular speed of the crankshaft and wherein decreasing the angular speed of the compensating mass comprise moving the compensating mass element at an angular speed that is slower than the angular speed of the crankshaft.

\* \* \* \* \*

UNITED STATES PATENT AND TRADEMARK OFFICE
CERTIFICATE OF CORRECTION

PATENT NO.       : 8,701,616 B2                                                                Page 1 of 1
APPLICATION NO. : 12/602470
DATED            : April 22, 2014
INVENTOR(S)      : Kreuter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-ninth Day of September, 2015

Michelle K. Lee
*Director of the United States Patent and Trademark Office*